United States Patent [19]
Chervenak et al.

[11] Patent Number: 5,558,692
[45] Date of Patent: Sep. 24, 1996

[54] OPTICAL WAVEGUIDE PREFORM MEASUREMENT DURING MANUFACTURE

[75] Inventors: William J. Chervenak, Big Flats; Robert S. Wagner, Corning, both of N.Y.

[73] Assignee: Corning Incorporated, Corning, N.Y.

[21] Appl. No.: 279,402

[22] Filed: Jul. 25, 1994

[51] Int. Cl.$^6$ ................................................ C03B 37/07
[52] U.S. Cl. ............................... 65/382; 65/484; 65/485; 65/491
[58] Field of Search .......................... 65/382, 484, 485, 65/491

[56] References Cited

U.S. PATENT DOCUMENTS

| | | |
|---|---|---|
| 5,192,350 | 3/1993 | Le Sergent ............................. 65/491 X |
| 5,221,306 | 6/1993 | Fleming, Jr. et al. ................. 65/491 X |

FOREIGN PATENT DOCUMENTS 60-260429  12/1985  Japan ....................................... 65/491

Primary Examiner—David A. Simmons
Assistant Examiner—M. Curtis Mayes
Attorney, Agent, or Firm—William J. Chervenak

[57] ABSTRACT

An apparatus and method for measuring preform diameter and runout during manufacture of the preform. A Keyence LB1201 displacement gauge is used to determine distance between a sensing unit and the surface of an optical waveguide preform. It was found that the gauge produced an alternating signal imposed on a constant signal. By dividing the signal into its constant and alternating components, preform diameter and runout can be measured. A water cooled band pass filter and housing are used to protect the sensing unit.

The preform surface can be mapped using a pair of sensing units, capable of moving parallel to the preform axis of rotation, located in diametric opposition about the preform.

24 Claims, 6 Drawing Sheets

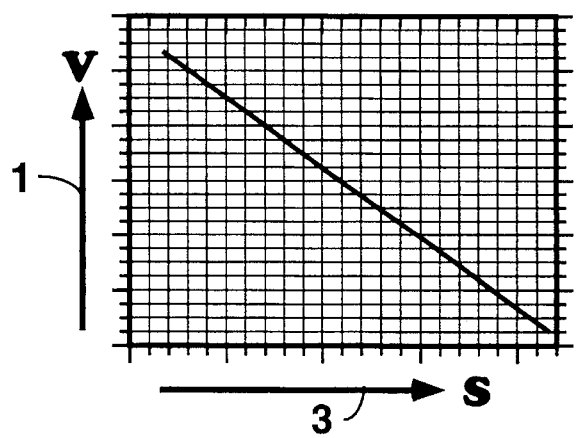
FIG. 1b
FIG. 1a
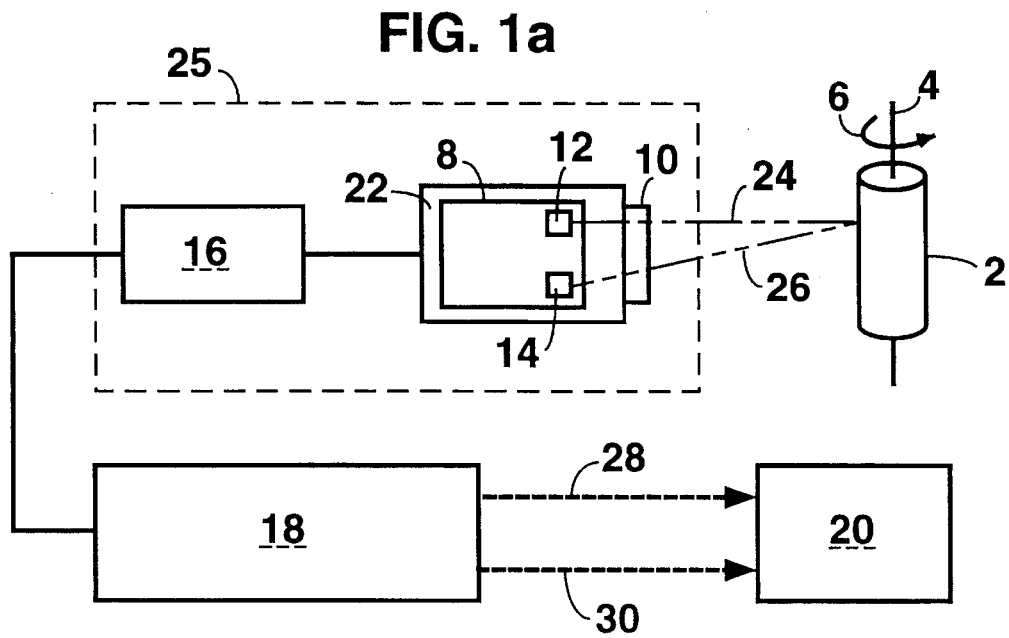
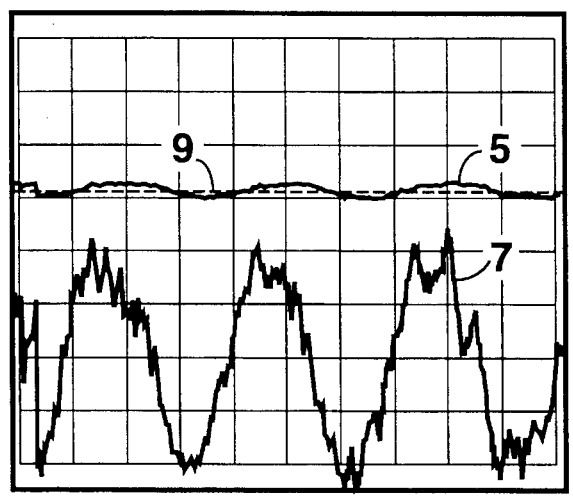
FIG. 1c

FIG. 4a      FIG. 4b      FIG. 4c      FIG. 4d

FIG. 7
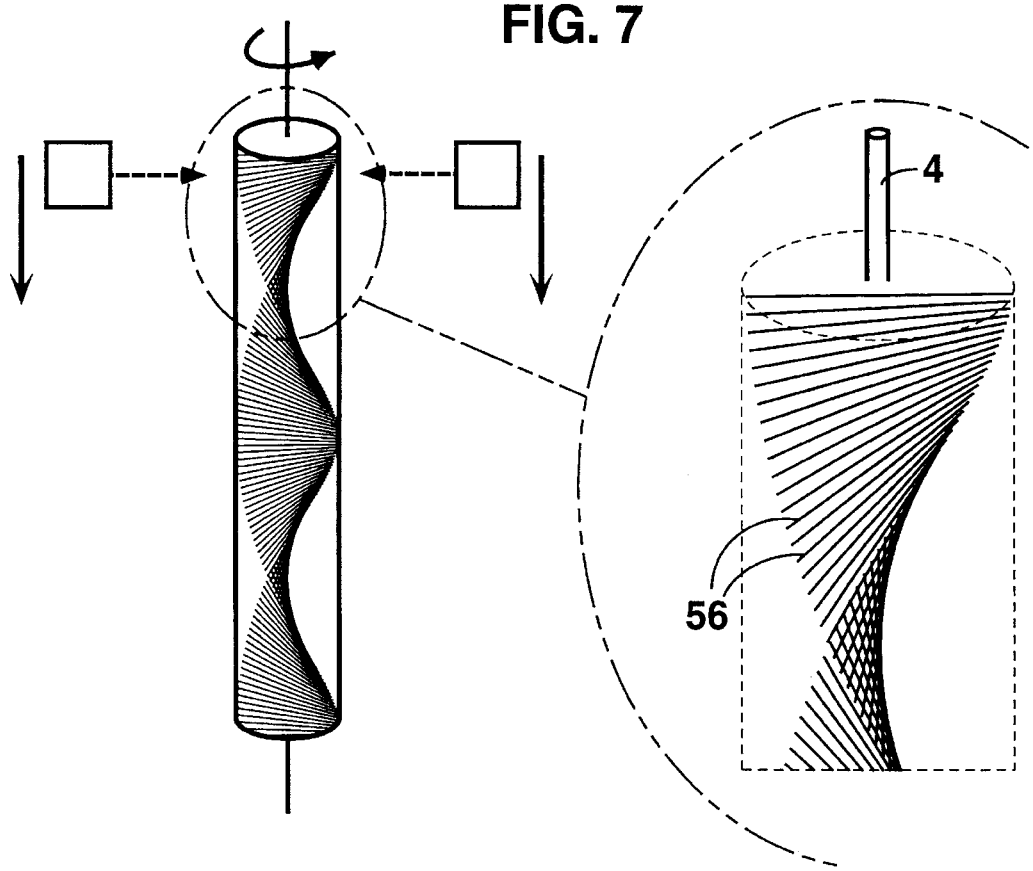
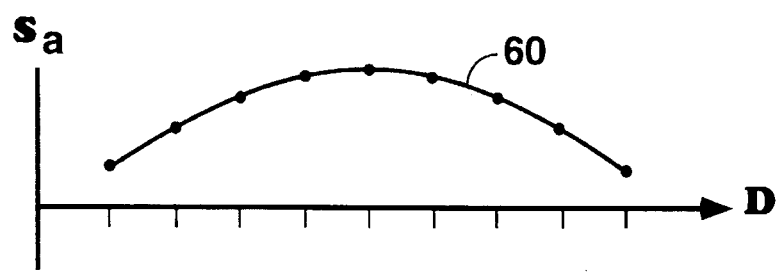
FIG. 8
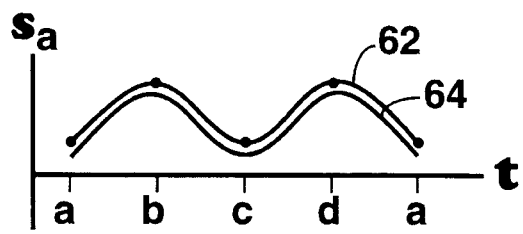
FIG. 9a
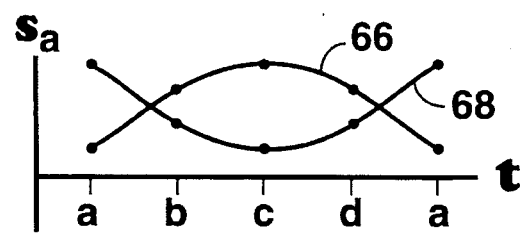
FIG. 9b

OPTICAL WAVEGUIDE PREFORM MEASUREMENT DURING MANUFACTURE

BACKGROUND

The invention relates to a method and apparatus for measurement of the diameter and runout, of an optical waveguide preform during manufacture of the preform. The runout is the deviation of the preform from cylindrical symmetry which includes deviation from roundness or straightness.

The manufacture of optical waveguides involves a series of carefully controlled steps. In addition to optical properties such as attenuation, dispersion, including polarization mode dispersion, numerical aperture and cut off wavelength, the fiber geometry must be controlled to small tolerances. All of these properties to a large extent are built into the waveguide fiber in the preform manufacturing step.

While feedback systems at the draw can generally maintain fiber diameter within specification, diameter control is facilitated by preform uniformity. Also, other fiber geometry derives directly from the geometry of the preform. Small deviations in preform geometry, of the order of a tenth of a millimeter, can produce out of tolerance waveguide fiber.

Typical waveguide geometry specifications include, outside diameter, core diameter, concentricity of core and clad and roundness of core and clad. Each of these quantities depends substantially upon the shape and symmetry of the waveguide preform. In addition, for singlemode waveguide fiber, cut off wavelength depends upon the size ratio of core and clad. A measurement of preform geometry is therefore essential for selecting those preforms which ultimately can be drawn into a waveguide fiber which meets the specified limits and tolerances.

However, because preform manufacture is typically done in a hot, corrosive environment, which may include a flame or other source of heat and light, attempts to measure preform geometry during manufacture have not been successful.

Further difficulties in preform measurement during manufacture are:

the measurement must not involve mechanical contact, because such contact with the preform surface can disturb the laydown process thereby upsetting the preform geometry or the preform drawing characteristics;

the heat and light associated with the deposition process tend to blind or destroy non-contact sensors;

the measurement should be continued for the entire manufacturing time, because defects can occur at any stage of the preform manufacturing process; and, the measurement must be accurate to at least a millimeter and preferably a few tenths of a millimeter.

Thus, fatal preform defects typically are not found until the preform has been drawn into waveguide fiber and measured, i.e., after full manufacturing cost has been incurred.

Each step in the waveguide fiber manufacturing process consumes energy, costly liquids and gases, machine time and labor. The preform manufacturing step is the starting point of the process. Thus, identifying a defective preform during manufacturing results in substantial energy, raw material and labor cost savings and greatly improves utilization of factory equipment.

Hence there is a need is for a measurement during the preform manufacturing step which is predictive of the quality of waveguide fiber drawn from the preform.

The characteristics of such a measurement are:

the preform surface must not be touched or disturbed;

the measurement should be accurate enough to detect sub-millimeter deviations in preform geometry;

the measurement apparatus must be stable under the severe environment of perform manufacture; and, the measurement must be essentially continuous for the duration of the preform manufacturing process.

SUMMARY OF THE INVENTION

The present inventions meets the requirements for a workable preform measurement during the preform manufacturing step and overcomes the difficulties outlined above.

A first aspect of the invention is an apparatus for measuring preform diameter and runout during preform manufacture. As successive layers of preform material are deposited on a bait rod, thereby making a preform, at least one distance gauge continuously measures distance between the preform surface and the sensing unit of the displacement gauge.

The sensing unit is spaced apart from the preform and comprises a light source and a light detector. Light from the source reflects from the preform surface and is received by the detector. The signal from the detector is sent to the control unit of the displacement gauge. The control unit translates the detector signal into a voltage proportional to the distance of the sensing head from the preform surface. In a preferred embodiment the light source is substantially centered on the preform. For a preform diameter greater than about 7 mm, a centering method which yields a position about ±1 mm from preform centerline is acceptable.

A housing protects the sensing unit from the heat, radiation and corrosive compounds present in the laydown environment. The housing has an opening to allow the sensing unit to send a light beam to the preform surface and receive light reflected from the preform surface. The housing may be cooled by circulating a liquid or a gas, e.g., water or compressed air, in thermal contact with the housing.

A light filter, also cooled, is sealed over the housing opening to prevent passage of essentially all electromagnetic radiation wavelengths except the wavelength range of the sensing unit source.

Both the housing and the filter are constructed of material resistant to the corrosive compounds in the preform manufacturing environment.

The voltage signal from the control unit is fed to an electronic circuit which separates the constant portion of the signal from the alternating portion of the signal. Means are provided to translate the constant and alternating signal portions into the diameter and runout, respectively, of the preform.

In one embodiment, the translating means comprise an electronic circuit to rectify the alternating signal and to read and hold, for a selected time interval, the peak of the rectified signal. A computer is used to record the constant signal and the peak of the alternating signal and to translate these respective signals into preform diameter and runout.

Yet another embodiment of the apparatus includes means for moving the sensing unit parallel to a reference line. The preferred reference line is the axis of rotation of the preform. The term axis of rotation is given the generally accepted definition, i.e., the axis of rotational symmetry.

In a preferred embodiment, means are provided for recording the period of the alternating signal.

Another aspect of the inventive apparatus includes two sensing units spaced apart from the preform and having their respective light sources directed at different areas of the preform surface. In a preferred embodiment, the two sensing units are coplanar and have their respective light sources directed at diametrically opposite surfaces of the preform. In a further embodiment, the two sensing heads are moved in unison parallel to a reference line, wherein the preferred reference line is the preform axis of rotation.

The invention is also a method of measuring diameter and runout of a preform during manufacture. The steps of the method include:

providing at least one distance gauge, spaced apart from the preform and having a sensing unit and a control unit, to produce an electrical signal proportional to the distance between the sensing head and the preform surface;

dividing the electrical signal into a constant portion and an alternating portion;

recording the signals and translating the respective constant and alternating signals into a measure of preform diameter and runout.

An embodiment of the method includes the step of moving the sensing unit parallel to a reference line. The preferred reference line is the preform axis of rotation.

Another aspect of the invention is a method of measuring diameter, runout and ellipticity of a preform during manufacture using two distance gauges each having a sensing unit spaced apart from the preform. The sensing units are positioned to be coplanar and have their respective sources directed at diametrically opposed parts of the preform surface. The respective signals from the two distance gauges are translated into distances between the sensing heads and the preform surface. The respective distance measurements are translated into a preform thickness measurement. Successive thickness measurements are made over a time period greater than or equal to the time required for one revolution of the preform. The time interval between thickness measurements is in general less than the time for one preform revolution.

The respective signals from the two distance gauges are divided into a constant portion and an alternating portion. The respective constant portions are recorded and translated into preform diameter measurements and the respective alternating portions into runout measurements.

In an embodiment of the method, the periods of the respective alternating signal portions are measured and recorded. Further, the alternating signal from each distance gauge is separated into a first signal having a period essentially equal to the period of rotation of the preform and a second signal having a period essentially equal to half the period of rotation of the preform. The first signal is translated into a measure of preform straightness. The second signal is translated into a measure of preform ellipticity.

In a further embodiment of the method, the two sensing heads are moved parallel to a reference line, where the preferred reference line is the axis of rotation of the preform.

Yet another aspect of the invention is a method for mapping the shape of an optical waveguide preform during manufacturing. Two distance gauges have their respective sensing units positioned to face diametrically opposite surfaces of the preform and are substantially centered on the preform. The sensing units are spaced apart from the preform and are located at a fixed distance relative to a reference line. The respective signals from each distance gauge are translated into measurements of the distance between the respective sensing units and the preform. These distance measurements are translated into preform thickness measurements. Successive thickness measurements are recorded over a time period greater than the time required for the preform to make one revolution. The time interval between successive thickness measurements is less than or equal to about 0.25 of the time required for one preform revolution. The two sensing heads are moved in unison parallel to a reference line.

The preferred reference line is the axis of rotation of the preform. The preferred speed of movement of the sensing units is such that the locus of points at which each sensing unit makes a distance measurement is a helix having a pitch of no greater than about 10 cm.

Other advantages and aspects of the invention will be made apparent by the detailed description and the following drawings.

BRIEF DESCRIPTION OF THE DRAWINGS

FIG. 1a is a side view schematic representation of the preform and the measurement apparatus.

FIG. 1b is a chart of voltage output vs. distance between a target and the sensing unit.

FIG. 1c is a representation of measurements made on a preform during the manufacturing process wherein the distance gauge signal has been divided into an alternating portion and a constant portion.

FIG. 4a is a view along the preform length showing the sensing unit and a preform having an elliptical cross section.

FIG. 4b is the view of FIG. 4a rotated 90° counter-clockwise.

FIG. 4c is the view of FIG. 4b rotated 90° counter-clockwise.

FIG. 4d is the view of FIG. 4c rotated 90° counter-clockwise.

FIG. 7 is a three dimensional schematic of thickness measurements made using two distance gauges which move parallel to the axis of rotation of the preform and map the preform surface.

FIG. 8 is an chart representative of runout measurements made using one distance gauge which moves parallel to the axis of rotation of the preform.

FIG. 9a is a chart representative of the alternating signals from two distance gauges arranged as shown in FIG. 6, where the preform has an elliptical cross section.

FIG. 9b is a chart representative of the alternating signals from two distance gauges arranged as shown in FIG. 6, where the preform is bowed.

DETAILED DESCRIPTION OF THE INVENTION

Figure 2:
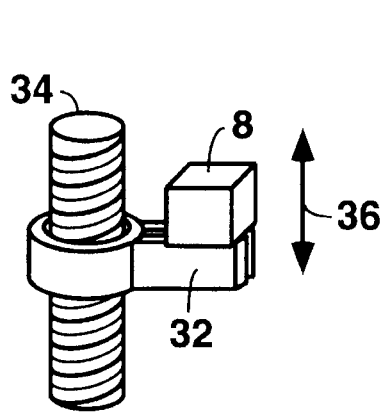
FIG. 2 is a schematic illustration of means for moving the sensing unit.

The figures are intended to facilitate description of the invention and in no way limit the scope of the invention. The figures are not necessarily drawn to scale.

The main features of the invention are shown in FIG. 1a. Optical waveguide preform 2 rotates about axis 4 in a direction indicated by arrow 6. The machinery for holding and rotating the bait rod and the system for depositing preform material on the bait rod are well known in the art and are not shown. See for example U.S. Pat. No. 4,486,212, Berkey. Sensing unit 8 is encased in protective housing 22. The opening of the housing, facing the preform, is covered and sealed by light filter 10. The light filter together with the housing protects the light source 12 and the light detector 14, located within the sensing unit 8, from the heat, stray light and corrosive compounds present in the preform manufacturing environment. Filter 10 is chosen to pass the band of wavelengths characteristic of light source 12. The apparatus for cooling the housing and filter is conventional and is not shown. The housing and filter may be cooled using a heat exchanger unit employing a liquid or gaseous coolant. Satisfactory cooling was achieved by circulating compressed air through the enclosure formed by the housing and filter.

A light ray 24 is incident upon the preform surface and reflected ray 26 is received by the detector. The electric signal produced by the detector in response to the reflected light is sent to control unit 16. This control unit converts the detector signal into a voltage proportional to the perpendicular distance between source 12 and the surface of preform 2. The sensing unit, with its protective housing and filter, and the control unit comprise the distance gauge 25.

The unit 25 is a Keyence LB1201, available from Keyence Corporation of America, 17—17 Route 208 North, Fair Lawn, N.J. 07410. The LB1201 unit is modified to include the protective housing and filter and their accompanying cooling system. The Keyence instrument performed well when initially positioned about 200 mm from the target. The range of the instrument is about ±100 mm from this initial position.

The voltage signal from control unit 16, is sent to electronic circuit 18, which divides the signal into an alternating portion and a constant portion. Many circuits capable of sorting frequencies are known in the art. A block diagram of such a circuit FIG. 10. For details of low pass, high pass and band pass circuits see, *The Art of Electronics*, Horowitz and Hall, ISBN 0 521 23151, pp. 148–161. This reference also contains details of peak hold circuitry on pp. 118–120.

The translating unit 20 in FIG. 1 receives the divided signal and translates the constant signal into a preform diameter and the alternating signal into a preform runout measurement.

The translating unit can be an analog or a digital device. The translation of a the constant voltage into a diameter measurement is accomplished by effectively storing a table in the device which relates a particular voltage level to a diameter. The table is constructed from knowledge of the distance between the sensing unit light source and the axis of rotation of the preform, $D_{ref}$. For this reference choice, the diameter is, Diameter=$2 \times (D_{ref} - D_s)$, where $D_s$ is the distance corresponding to the constant voltage signal level.

FIG. 1b is a graph of distance on the S-axis versus constant voltage on the V-axis for the Keyence LB1201 instrument. The linearity of the relationship, evident from FIG. 1b, extends over a distance range of about 200 mm, which corresponds to the working range of ±100 mm noted above. Any convenient reference point, line or surface which has a known relationship to the preform surface may be used to translate the constant voltage into a preform diameter.

The amplitude of the alternating signal portion is a direct measure of runout, because a variation in voltage from control unit 16 is a variation in $D_s$ which in turn is a deviation of the preform from cylindrical symmetry. One strategy for translating the alternating signal into a runout measurement is to rectify the signal and then read and record successive peak voltages. The voltage signal from unit 16 is continuous. An appropriate signal sampling frequency can be selected in the translating unit 20.

FIG. 1c is a plot of a distance gauge voltage versus time. This plot may be recorded using a chart recorder, by a storing oscilloscope or by a computer. The constant voltage level corresponds to line 9, the symmetry line about which the alternating voltage varies. Curve 7, which more clearly shows the voltage corresponding to runout, is an 20×amplification of curve 5. A frequency or period of the runout signal as well as the amplitude is obtained from curve 7. The irregularities superimposed on the base signal are smoothed by using a peak reading or signal averaging technique. The period and amplitude may be approximated from the raw data or determined more accurately by processing the signal in electronic circuit 18 and recording and reading the results in digital or analog translating unit 20.

Figure 10:
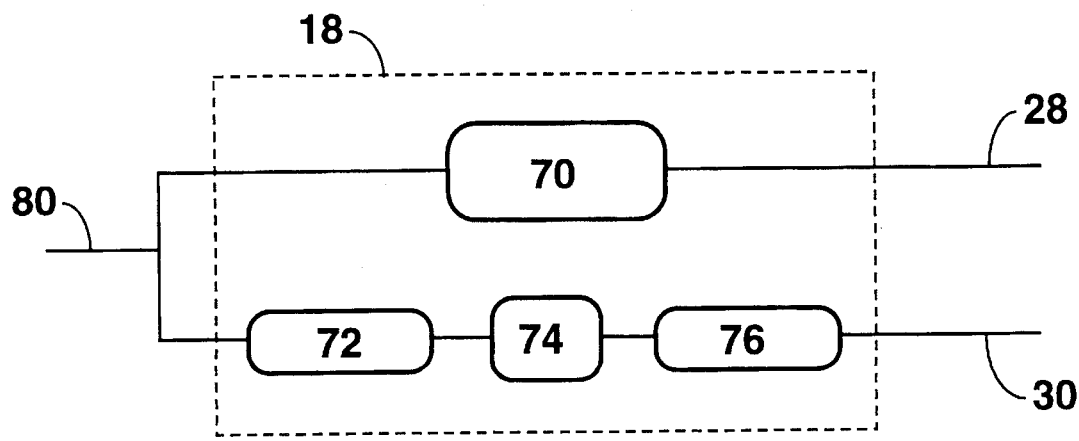
FIG. 10 is a block diagram showing details of a circuit for separating the Keyence signal into a constant portion and an alternating portion.

FIG. 10 is a block illustration of electronic circuit 18. The Keyence signal enters circuit 18 at 80. Low pass filter 70, which typically would be chosen to pass frequencies less than about 0.25/sec, produces the constant diameter signal at output 28. Band pass filter 72, which may be chosen to pass a frequency band from about 0.5/sec to about 10/sec, removes the constant voltage component and delivers the alternating portion of the signal to amplifier 74. Rectifier and peak detector 76 then provide a runout reading at output 30.

Because runout can occur at isolated segments of the preform or change over the length of the preform, it is advantageous to move the sensing unit parallel to the preform axis of rotation. The movement can be accomplished by a number of means including the arrangement shown in FIG. 2. The sensing unit 8 can be moved in either of the directions indicated by arrows 36 by rotating the threaded rod 34. A sleeve 32, having a threaded inside surface, moves along the rod as the rod rotates. The sensing head may be attached to a platform projecting from the sleeve. As an alternative, the sensing unit may be mounted on a platform having a base which slides on a precision rail. The platform may be moved by a piston or a drive mechanism mounted on the platform and gripping the rail.

The interpretation of the runout data is complicated by the several preform conditions which can cause a runout signal to appear. For example, a bump on the preform, an elliptical preform cross section or a bowed preform, i.e. a preform which deviates from straightness, all will result in the appearance of an alternating runout voltage.

The case of a preform having an elliptical cross section but no lumpiness or bow is illustrated in FIGS. 4a–4d. The marker 38 is used to show the rotation of the preform relative to the sensing unit. In FIG. 4a measured distance 40 is at its minimum value. As the preform rotates 90°, the distance 40 increases to its maximum value shown in FIG. 4b. After another 90° rotation the distance 40 is again minimum, FIG. 4c, and reaches another maximum after rotating an additional 90°, FIG. 4d.

Figure 4E:
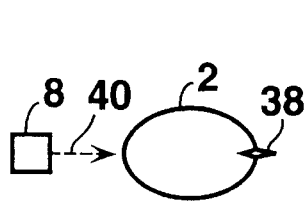
FIG. 4e is a chart of distance between the sensing unit and the preform surface for FIGS. 4a–4d.
Figure 4E:
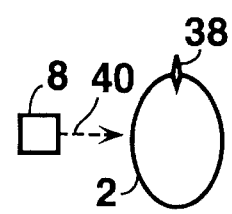
Figure 4E:
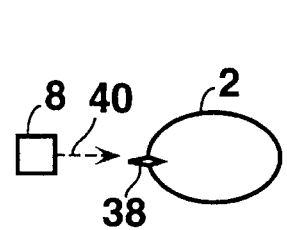
Figure 4E:
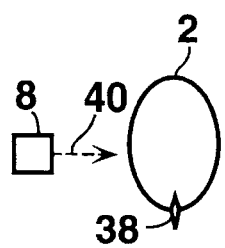
Figure 4E:
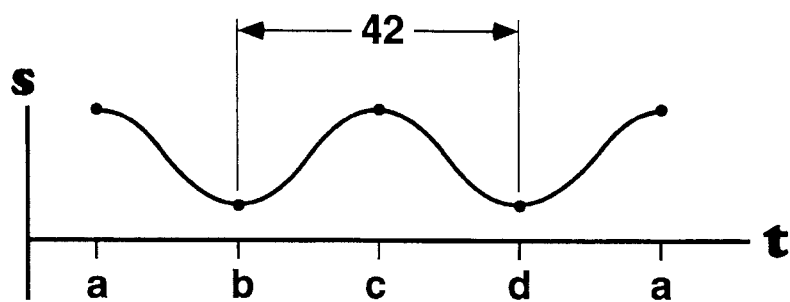
Figure 5A:
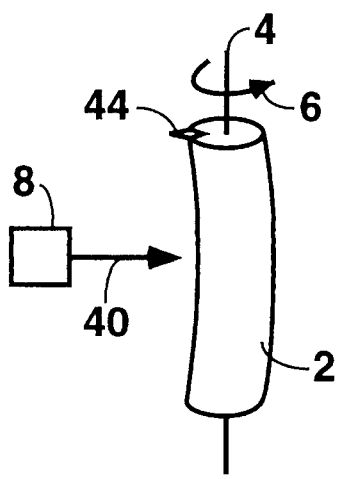
FIG. 5a is a side view of the sensing unit and a bowed preform.
Figure 5C:
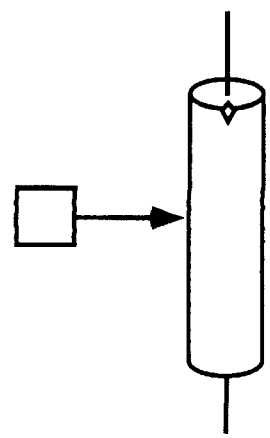
FIG. 5c is a the view of FIG. 5b rotated 90° counter-clockwise.
Figure 5B:
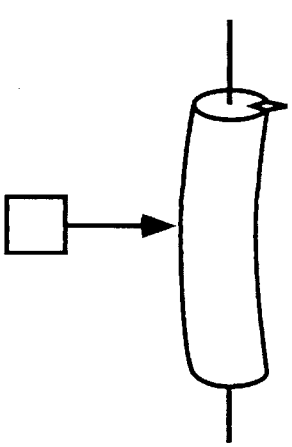
FIG. 5b is a the view of FIG. 5a rotated 90° counter-clockwise.
Figure 5D:
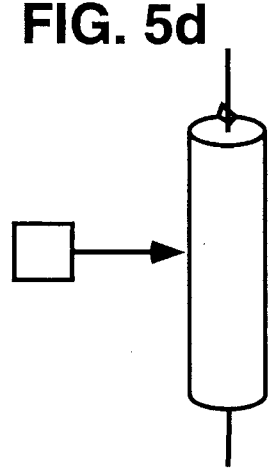
FIG. 5d is a the view of FIG. 5c rotated 90° counter-clockwise.

The chart of runout signal versus time, FIG. 4e, shows the periodic runout voltage corresponding to the periodic change in preform surface to sensing head distance. The period of the voltage signal is half the period of rotation of the preform.

Figure 5E:
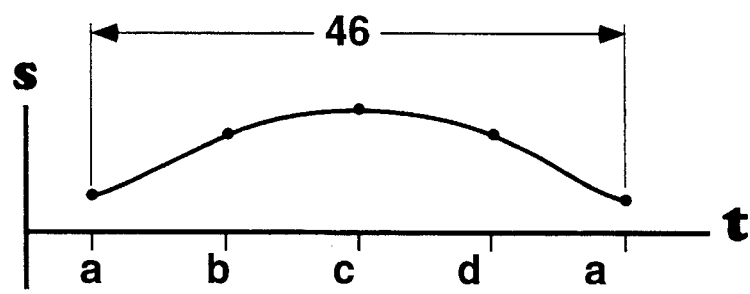
FIG. 5e is a chart of distance between the sensing unit and the preform surface for FIGS. 5a–5d.

The case of a preform which is round in cross section but bowed from end to end is illustrated in FIGS. 5a–5d. The marker pointer 44 shows the rotation of preform 2 relative to sensing unit 8. The preform rotates 90° in each successive view from FIG. 5a to FIG. 5d. In this case, the distance 40 passes through only one maximum value and one minimum value as the preform makes one revolution. FIG. 5e shows the runout voltage versus time for one revolution of the preform. Here the period of the alternating runout voltage is equal to the preform period of revolution.

The interpretation of the alternating signal is thus facilitated by resolving the signal into one part having a period about equal to the period of rotation of the preform and another part having a period equal to about half the preform rotation period. The resolution of the alternating signal into component periods or frequencies can be accomplished using circuitry as indicated in block diagram form in FIG. 11.

The continuous signal from Keyence 25 is passed through three parallel legs. One leg contains low pass filter 70 and provides the constant diameter signal at 28. A second leg contains a band pass filter 78 at the frequency of rotation of the preform and provides a bow signal at 82 after passing through amplifier 74 and peak detector 76. A third leg contains a band pass filter 80 at twice the frequency of rotation of the preform. An ellipticity signal is provided at output 84. Additional high pass or band pass filters may be added in parallel to those in FIG. 11 should a particular characteristic of the process indicate a need for such additional paths.

Any random preform irregularities will appear as changes in the constant voltage signal. Repetitive preform defects will in general have a period distinct from that of the ellipticity or bow.

For the preform measurement to be a quality control tool as well as a process diagnostic, it is essential that the runout measurement be associated with a particular physical characteristic of the preform. Distinguishing ellipticity from bow or random irregularities allows an acceptance criteria to be correctly applied to the preform. Ellipticity in the waveguide contributes strongly to polarization mode dispersion. Measuring ellipticity in the preform may be predictive of the properties of the waveguide fiber drawn therefrom.

The preform measurement is a powerful process adjustment and control tool. Proper process adjustments can be made when the nature of the preform defect is known. Furthermore, causal connections can be established between preform irregularities and drawing difficulties or waveguide fiber defects. And causality between preform manufacturing adjustments and preform geometry can be established.

In the general case the preform may be bowed, be elliptical in cross section and have random irregularities in the form of bulges or indentations. A plurality of defects can be distributed along a preform in a way that one defect can mask the presence of another. For example a bulge could fill in a concave bowed section. Ellipticity, if oriented with the major axis in the plane of a bow and having about the same magnitude as a bow could diminish the amount of bow measured or completely mask the bow.

At least two techniques can be used to distinguish the type and true size of preform defects. One technique includes moving a single sensing head essentially parallel to the preform axis of rotation. Another technique includes using two sensing heads to effectively map the surface of the preform.

Measuring diameter and runout at successive positions along the preform may produce an alternating signal amplitude as shown in FIG. 8. The FIG. 8 chart shows alternating signal amplitude on the $S_a$-axis and distance along the blank on the D-axis. Curve 60 shows essentially a zero runout signal at the ends of the preform and a maximum runout signal near the preform center. Because the preform is mechanically held at each end, runout at the ends is due to ellipticity or irregular bulges and indentations. Ellipticity is distinguished by its characteristic period or frequency. Bow will be essentially zero at each end of the preform and will reach a maximum near the preform center. Thus curve 60 is characteristic of a bowed preform which is essentially round in cross section. This conclusion may be verified by recording runout signal versus time to show the signal period or frequency which is characteristic of bow.

A chart characteristic of runout amplitude versus position along the preform for a preform which is straight but which has an elliptical cross section is essentially a horizontal line, i.e., the peak alternating signal is essentially constant along the preform. Again the ellipticity can be verified by reading the period or frequency of the runout signal.

More complex preform defects, e.g., combinations of bow, ellipticity and irregular bulges or indentations, may be analyzed using a single moving head through examination of the constant and alternating signals versus position along the preform. This examination is combined with analysis of the constant and runout signals versus time to relate the complex signal with a physical characteristic of the preform.

Figure 3:
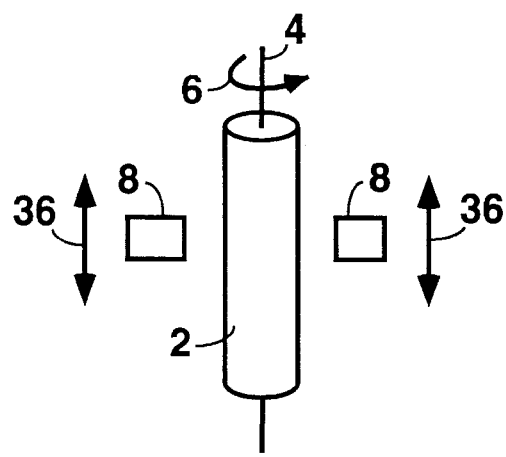
FIG. 3 is a side view of a preform with two sensing units positioned in diametric opposition about the preform.
Figure 6:
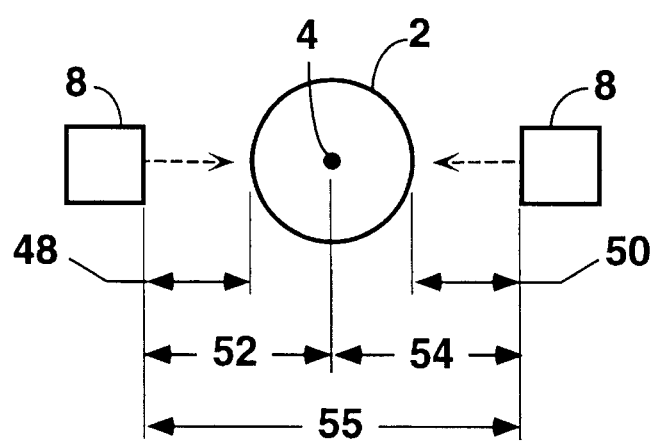
FIG. 6 is a view along the length of a preform showing two diametrically opposed sensing units.

Analysis of complex preform surface variations can be facilitated by using two sensing units as illustrated in FIG. 3 and FIG. 6. FIG. 3 shows two sensing heads 8 positioned in diametric opposition about perform 2. Arrows 36 indicate the sensing heads are moveable parallel to the preform axis of rotation 4. FIG. 6, a view along the preform axis, shows sensing heads 8 substantially centered on preform 2. Data taken on cylindrical objects ranging in diameter from about 6.8 mm to about 12.7 mm indicate centering to within ±1 mm of true center is sufficient to allow proper interpretation of the Keyence signal. The sensing heads measure distances 48 and 50, respectively. The sensing heads are positioned at known distances 52 and 54, respectively, from the axis of rotation 4. Thus at a given time the thickness or diameter of the preform can be determined by combining the measured and known distances. That is, the preform thickness is given by the sum of distance 48 and distance 50 subtracted from distance 55, the sum of distances 52 and 54. Also, the position of the center of a line representing the preform thickness relative to the position of the axis of rotation 4 is found by comparing the difference, distance 52 minus distance 48, to the difference, distance 54 minus distance 50.

Therefore, carrying out the measurements as the sensing units are moved in unison parallel to the preform axis of rotation results in a three dimensional mapping of the preform surface as illustrated schematically in FIG. 7. The length of lines 56 represent the successive measured diameters of the preform. The location of the center of line 56 relative to the axis of preform rotation 4 is found as described above. Thus the ends of line 56 represent points on the preform surface. Successive lines spaced closer in time yield more surface detail. Successive lines spaced farther apart in time give less surface detail. Thus, the speed at which the sensing heads move parallel to the preform may be decreased or increased to yield greater or less detail, respectively. The time spacing between thickness measurements and the movement speed are dictated by the particular resolution required for a particular preform.

In general, a time between measurements, i.e., the sampling rate of translating unit 20 of FIG. 1, about equal to one fourth of the preform rotation period may be used. This time interval together with a parallel movement of the sensing units which yields a helical trace of measurement points having a pitch no greater than about 10 cm is believed to give sufficient surface resolution for most preform manufacturing processes.

Figure 11:
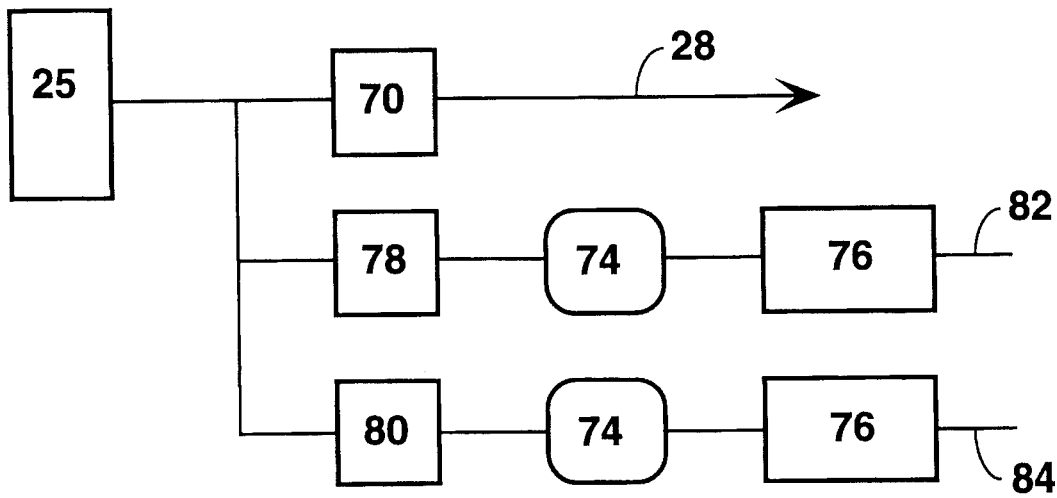
FIG. 11 is a block diagram of a circuit for dividing the Keyence signal into a constant portion and two alternating portions at two respective frequencies.

Another advantage of the dual sensing unit arrangement is shown in FIGS. 9a–9b. Curves 62 and 64 in FIG. 9a represent the alternating signal measurements made by the respective sensing units over time in the case of a preform having an elliptical cross section. The signals from the respective sensing units are in phase and may be added to yield a stronger ellipticity signal. This signal reinforcement together with the known period of the ellipticity runout signal may be used to find and amplify a signal which is masked by electrical noise. The same is true for the characteristic period of the bow runout signal. In the case of bow however one sensing unit signal must be phase shifted 180° before addition of the respective bow runout signals. In FIG. 11 an alternative to the filtering circuits described above is a set of lock-in amplifiers to isolate and amplify a set of desired frequencies contained in the Keyence signal.

The case of a bowed preform measured using two sensing units is shown in FIG. 9b. Alternating signal curves 66 and 68 are 180° out of phase and may be subtracted to give a straight line.

Making use of the relative alternating signal phase is particularly helpful in situations where the electrical noise is comparable to the alternating signals from the sensing units.

The possible combinations of number and positioning of detectors, time interval between measurements, speed of sensing head movement and methods of signal analysis is very large. For example, one may choose to position a pair of sensing units about a preform at an arbitrary angle relative to one another. Also, the sensing unit could be used to measure repeatedly at a given location along the preform and then index a few millimeters along the preform axis where the procedure is repeated. Some advantages are available from using three or more sensing units simultaneously. For example, a higher movement speed of the sensing units parallel to the preform is possible without loss of resolution when a plurality of sensing units is used.

Some preform manufacturing machines continuously weigh the preform as manufacturing proceeds. In this case, the present invention, which yields the preform volume, may be used to calculate the density of the preform material during manufacture. Knowledge of the density of preform material can lead to control of preform density and thus improved control of subsequent manufacturing steps.

EXAMPLE 1

Diameter Measurements

The diameter of a set of four disks were measured using a caliper. The results of ten measurements per disk are given in Table 1.

TABLE 1

| Disk | Ave. Diameter mm | Std. Dev. |
|---|---|---|
| 1 | 13.9120 | 0.0103 |
| 2 | 25.9390 | 0.0032 |
| 3 | 50.0540 | 0.0620 |
| 4 | 75.9550 | 0.0375 |

Figure 12:
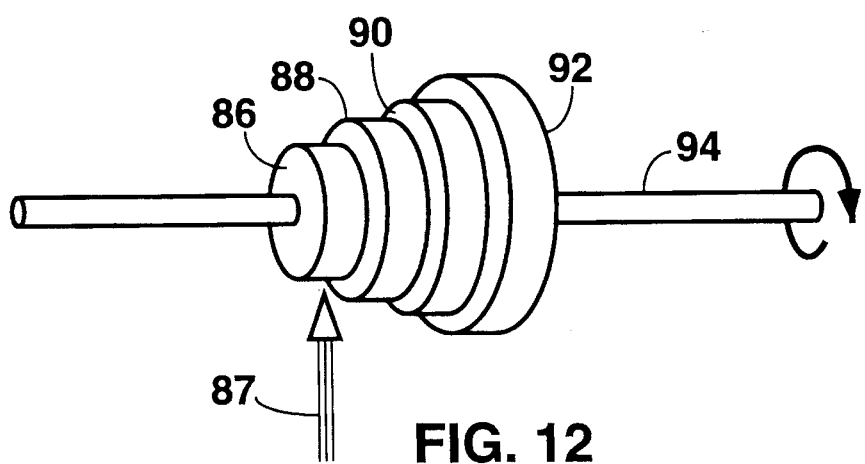
FIG. 12 is an illustration of the rotating disk arrangement used to check diameter measurement accuracy and repeatability.

The disks were then mounted on a spindle and rotated at 180 RPM. The mounting arrangement of disks 86, 88, 90 and 92 is shown in FIG. 12. The disks are fixed with respect to rotating spindle 94. The light beam from the Keyence sensing unit is shown as arrow 87. The diameter signal was read to a ten thousandth of a volt using a digital voltmeter. The results of ten repeat measurements are shown in Table 2.

TABLE 2

| Disk | Voltage | Std. Dev. |
|---|---|---|
| 1 | 2.5704 | 0.0011 |
| 2 | 2.2436 | 0.0010 |
| 3 | 1.6706 | 0.0010 |
| 4 | 1.0729 | 0.0015 |

Figure 13:
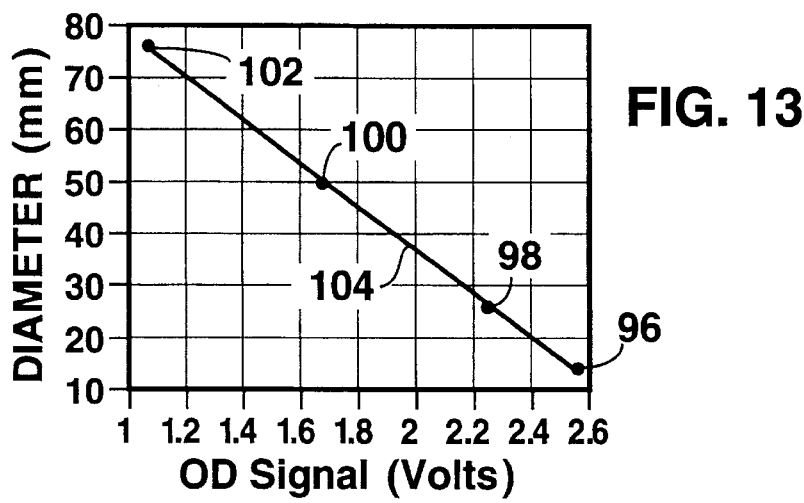
FIG. 13 is a comparison of the disk measurements made using a caliper to those made using the Keyence instrument.

FIG. 13 shows the points of Table 1, 96, 98, 100 and 102, respectively, plotted on the best fit line, 104, to the points from Table 2. The excellent agreement between diameters measured by the two methods is clear.

EXAMPLE 2

Runout Measurement of a Preform During Manufacture

Figure 14:
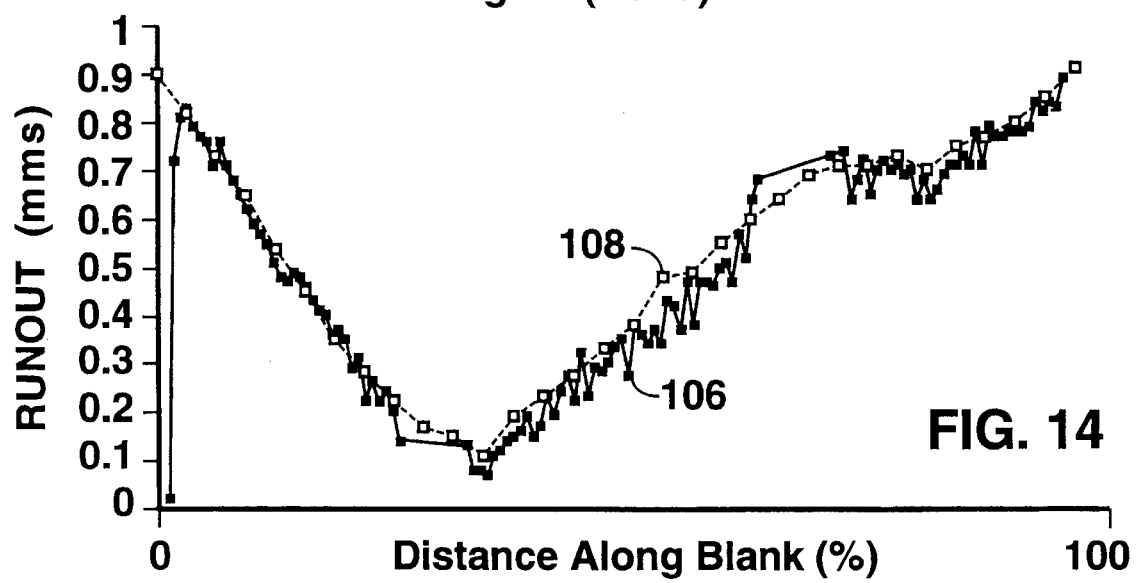
FIG. 14 is a chart of runout measurements made on a preform using the Keyence instrument and a Lasermike instrument.

The Keyence sensing unit was mounted on the housing of a traversing burner during the process of soot deposition. For this test the sensing unit housing and filter was cooled using compressed air at a pressure of about 30 psig. The runout trace versus position along the blank after a number of burner passes is shown as line 106 in FIG. 14. The deposition process was stopped and a Lasermike instrument was mounted on the burner housing and the runout again measured. The Lasermike runout is shown as line 108 in FIG. 14.

The Keyence runout signal was found to agree with that of the Lasermike to within instrument error and the error of instrument positioning relative to the preform surface.

Figure 15:
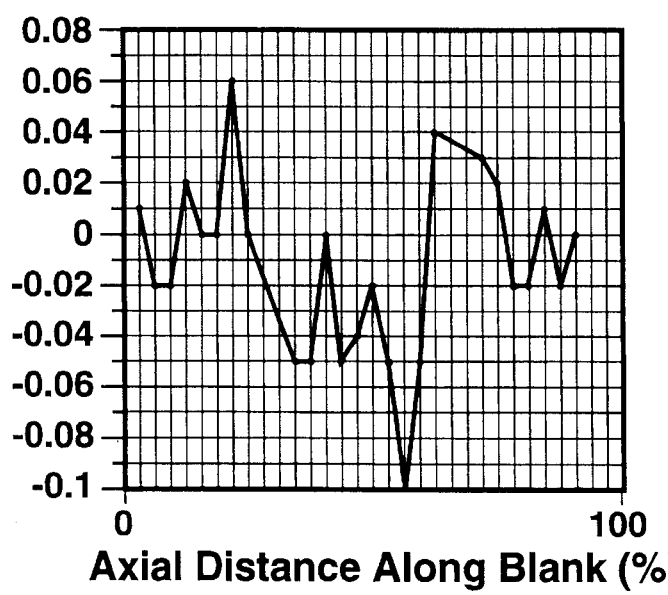
FIG. 15 is a difference chart made using the measurements from FIG. 14.

To indicate the good agreement between the Lasermike and Keyence measurements, a difference plot of Lasermike signal compared to the Keyence signal is shown in FIG. 15. The differences were taken from the two lines in FIG. 14.

Although specific embodiments of the invention have hereinbefore been disclosed and described, it will be understood that the scope of the invention is nevertheless to be defined by the following claims.

We claim:

1. An apparatus for measuring diameter and runout of an optical waveguide preform during manufacture of the preform, wherein successive layers of preform material are deposited on a rotating bait rod to form an outwardly growing preform surface, comprising:

at least one distance gauge comprising, a sensing unit electrically connected to a control unit, for measuring distance between said sensing unit and the preform surface, said sensing unit spaced apart from the preform and having a light source, directed at the preform surface and operating within a wavelength range, and a light detector, to receive source light reflected from the preform surface, and said at least one distance gauge providing an electrical signal proportional to the distance between said sensing unit and the preform surface;

a housing surrounding and supporting said sensing unit, said housing having an opening, facing the preform surface, to allow passage of the source light from said sensing unit to the preform surface and entrance of light reflected from the preform surface to said sensing unit;

a light filter covering the opening of said housing and sealed to said housing, said light filter constructed to transmit a range of light wavelengths substantially coincident with the operating wavelength range of the light source of said sensing unit;

an electronic circuit for dividing the electric signal from said distance gauge into an alternating signal portion and a constant signal portion; and, means for translating said alternating signal into a preform runout measurement and said constant signal into a preform diameter measurement.

2. The apparatus of claim 1 wherein the light source of said sensing unit is substantially centered on the preform.

3. The apparatus of claim 1 further including means for cooling said housing and said filter.

4. The apparatus of claim 1 wherein said housing is constructed of materials resistant to corrosive compounds present in the preform manufacturing environment.

5. The apparatus of claim 1 including means for moving said sensing unit parallel to a reference line.

6. The apparatus of claim 5 wherein the reference line is the axis of rotation of the preform.

7. The apparatus of claim 1 wherein said translating means comprises:

an electronic circuit for rectifying said alternating signal and reading and holding the peak value of said alternating signal over a preset time interval; and, a computer for recording said alternating and constant signals and for translating said signals into preform runout and preform diameter measurements, respectively.

8. The apparatus of claim 1 further comprising means for determining the period of said alternating signal portion.

9. The apparatus of claim 1 wherein two sensing units are spaced apart from the preform, each said unit substantially centered on the preform, the respective openings of said housings positioned to face separate parts of the preform surface.

10. The apparatus of claim 9 wherein said two sensing units are positioned on a plane substantially perpendicular to the axis of rotation of the preform, each said sensing unit facing respective diametrically opposed preform surfaces and the distance of each said unit from the preform axis of rotation is known.

11. The apparatus of claim 10 further including means to move said two sensing units in unison parallel to a reference line.

12. The apparatus of claim 11 wherein the reference line is the axis of rotation of the preform.

13. A method of measuring diameter and runout of an optical waveguide preform during manufacture of the preform, wherein successive layers of preform material are deposited on a rotating bait rod to form an outwardly growing preform surface, comprising the steps of:

providing at least one distance gauge comprising, a sensing unit electrically connected to a control unit, said sensing unit spaced apart from the preform, wherein said distance gauge produces an electric signal proportional to the distance between said sensing unit and the preform surface;

dividing said electric signal into an alternating signal portion and a constant signal portion; and recording and translating said alternating signal portion into a measurement of preform runout and said constant signal portion into a measurement of preform diameter.

14. The method of claim 13 wherein said sensing unit is substantially centered on the preform and is located at a fixed distance relative to a reference line.

15. The method of claim 14 further including the step of moving said sensing unit along a line parallel to the reference line.

16. The method of claim 14 wherein the reference line is the axis of rotation of the preform.

17. A method for measuring diameter, ellipticity and runout of an optical waveguide preform during manufacture of the preform, wherein successive layers of preform material are deposited on a rotating bait rod to form an outwardly growing preform surface, comprising the steps of:

providing two distance gauges each comprising, a sensing unit electrically connected to a control unit, wherein each said distance gauge produces an electric signal proportional to the respective distances between each said sensing unit and the preform surface;

positioning said two sensing units spaced apart from the preform surface and at respective fixed distances relative to a reference line, said two sensing units located to face diametrically opposite surfaces of the preform;

translating said respective electric signals into a measurement of the respective distances of each said sensing unit from the preform surface;

translating said respective distance measurements into a preform thickness measurement;

recording successive thickness measurements, made over a time period equal to or greater than the time required for the preform to make one revolution, the time interval between measurements being less than the time required for the preform to make one revolution;

dividing each said respective electric signal into an alternating signal portion and a constant signal portion; and recording and translating each said alternating signal portion into a measurement of preform runout and each said constant signal portion into a measurement of preform diameter.

18. The method of claim 17 further comprising the step of measuring and recording the period of said alternating signal portion.

19. The method of claim 17 further comprising the step of moving said two sensing units parallel to a reference line.

20. The method of claim 19 further comprising the steps:

separating said two respective alternating signal portions into two first signals having a period essentially equal to the period of rotation of the preform and two second signals having a period essentially equal to half the period of rotation of the preform; and, translating said first signals into a measurement of preform straightness and said second signals into a measure of preform ellipticity.

21. The method of claim 19 wherein the reference line is the axis of rotation of the preform.

22. A method for mapping the shape of an optical waveguide preform during manufacture of the preform comprising the steps of:

providing a rotating bait rod, wherein successive layers of preform material are deposited on the rotating bait rod to form an outwardly growing preform surface;

providing two distance gauges each comprising, a sensing unit electrically connected to a control unit, wherein each said distance gauge produces an electric signal proportional to the respective distances between each said sensing unit and the preform surface;

positioning said two sensing units spaced apart from the preform surface and at respective fixed distances relative to a reference line, said two sensing units essentially centered on the preform and located to face diametrically opposite surfaces of the preform;

translating said respective electric signals into a measurement of the respective distances of each said sensing unit from the preform surface;

translating said respective distance measurements into a preform thickness measurement;

recording successive thickness measurements, made over a time period equal to or greater than the time required for the preform to make one revolution, wherein the time interval between said successive measurements is less than or equal to the time required for the preform to make 0.25 revolutions; and, moving said two sensing units in unison parallel to the axis of rotation of the preform.

23. The method of claim 22 wherein the reference line is the preform axis of rotation.

24. The method of claim 22 wherein the rate of movement in said moving step is such that the locus of points, at which said respective distance measurements of each of said two sensing units are made, is a helix on the preform surface, wherein the pitch of said helix is no greater than about 10 cm.

* * * * *